United States Patent [19]

Fujioka

[11] Patent Number: 5,398,246
[45] Date of Patent: Mar. 14, 1995

[54] ISDN PRIVATE LOCAL SWITCHING SYSTEM

[75] Inventor: Masahito Fujioka, Tokyo, Japan

[73] Assignee: NEC Corporation, Tokyo, Japan

[21] Appl. No.: 61,388

[22] Filed: May 14, 1993

[30] Foreign Application Priority Data

May 14, 1992 [JP] Japan .................................. 4-121751

[51] Int. Cl.⁶ ............................................. H04L 12/56
[52] U.S. Cl. ...................... 370/94.1; 370/60; 370/110.1
[58] Field of Search ...................... 370/94.1, 60, 110.1, 370/112, 95.2, 95.3, 100.1; 379/94, 90, 219, 234, 225, 93, 96

[56] References Cited

U.S. PATENT DOCUMENTS 5,278,665  1/1994  Sawada et al. .................. 370/110.1

*Primary Examiner*—Douglas W. Olms
*Assistant Examiner*—Dang Ton
*Attorney, Agent, or Firm*—Foley & Lardner

[57] ABSTRACT

In a private branch exchange connected to an Integrated Services Digital Network, an ISDN user interface unit separates a signal from each user terminal into a B-channel packet and a D-channel packet and further separates the latter into a signaling message and a D-channel packet mode signal. The separated D-channel packet mode signal is multiplexed with D-channel packet mode signals from other user terminals into a D-channel packet mode multiplex signal and applied through a channel to an ISDN network interface unit, while the signaling message is applied to a controller for processing. In the ISDN network interface unit, the D-channel packet mode multiplex signal is multiplexed with the signaling message processed by the controller into an outgoing D-channel signal and transmitted with the B-channel packet to the ISDN.

7 Claims, 2 Drawing Sheets

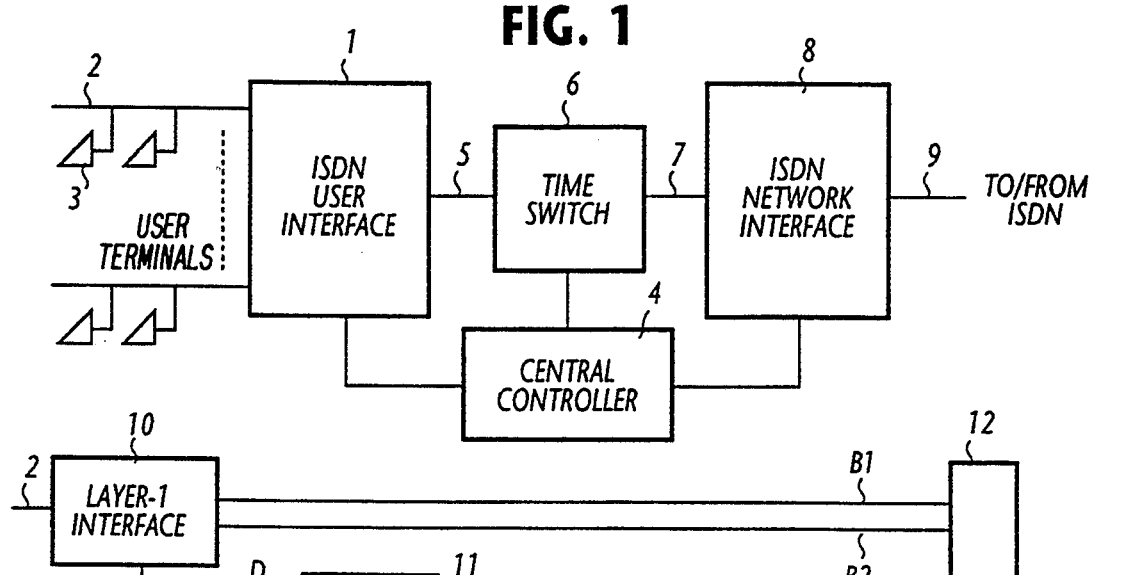
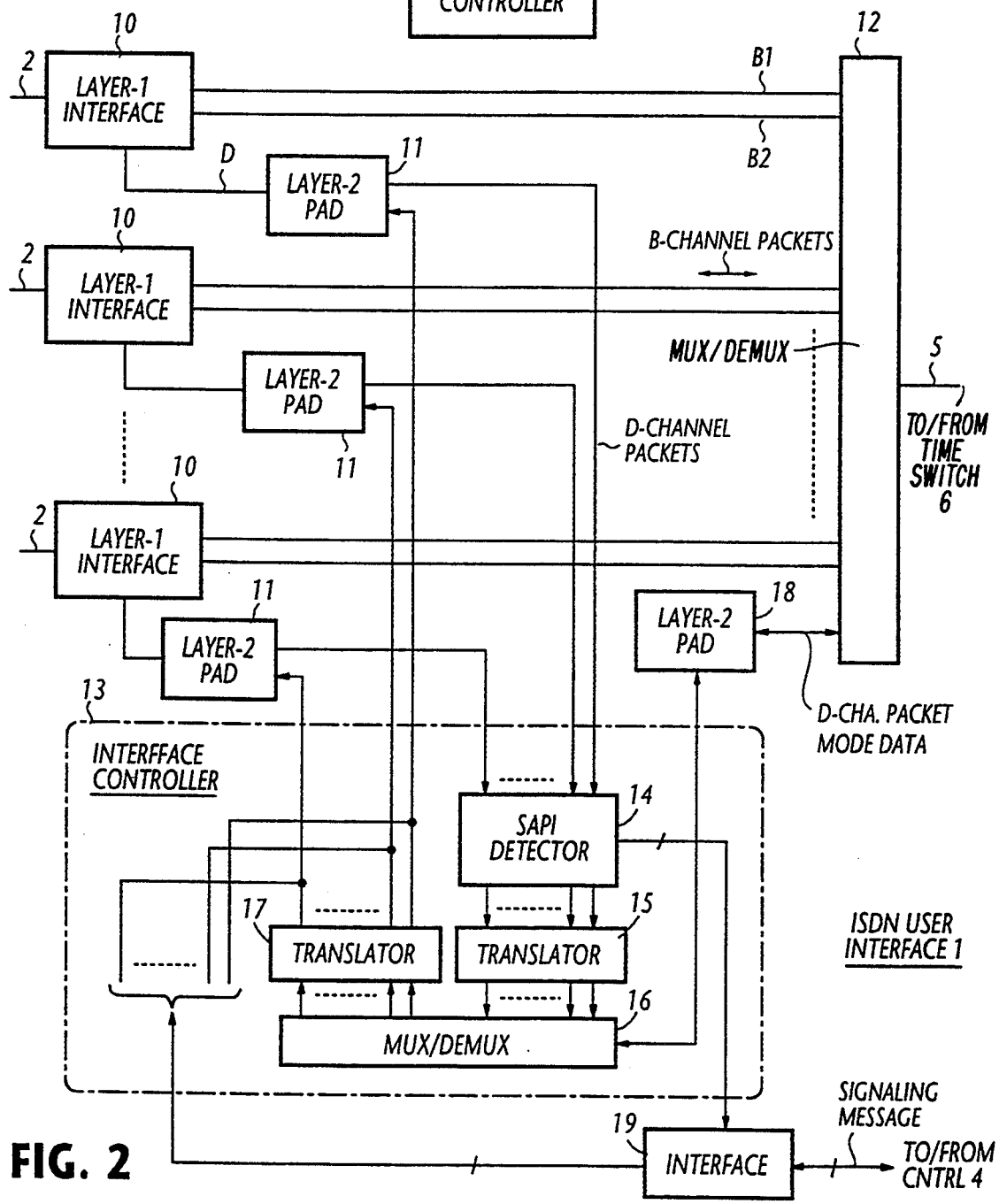

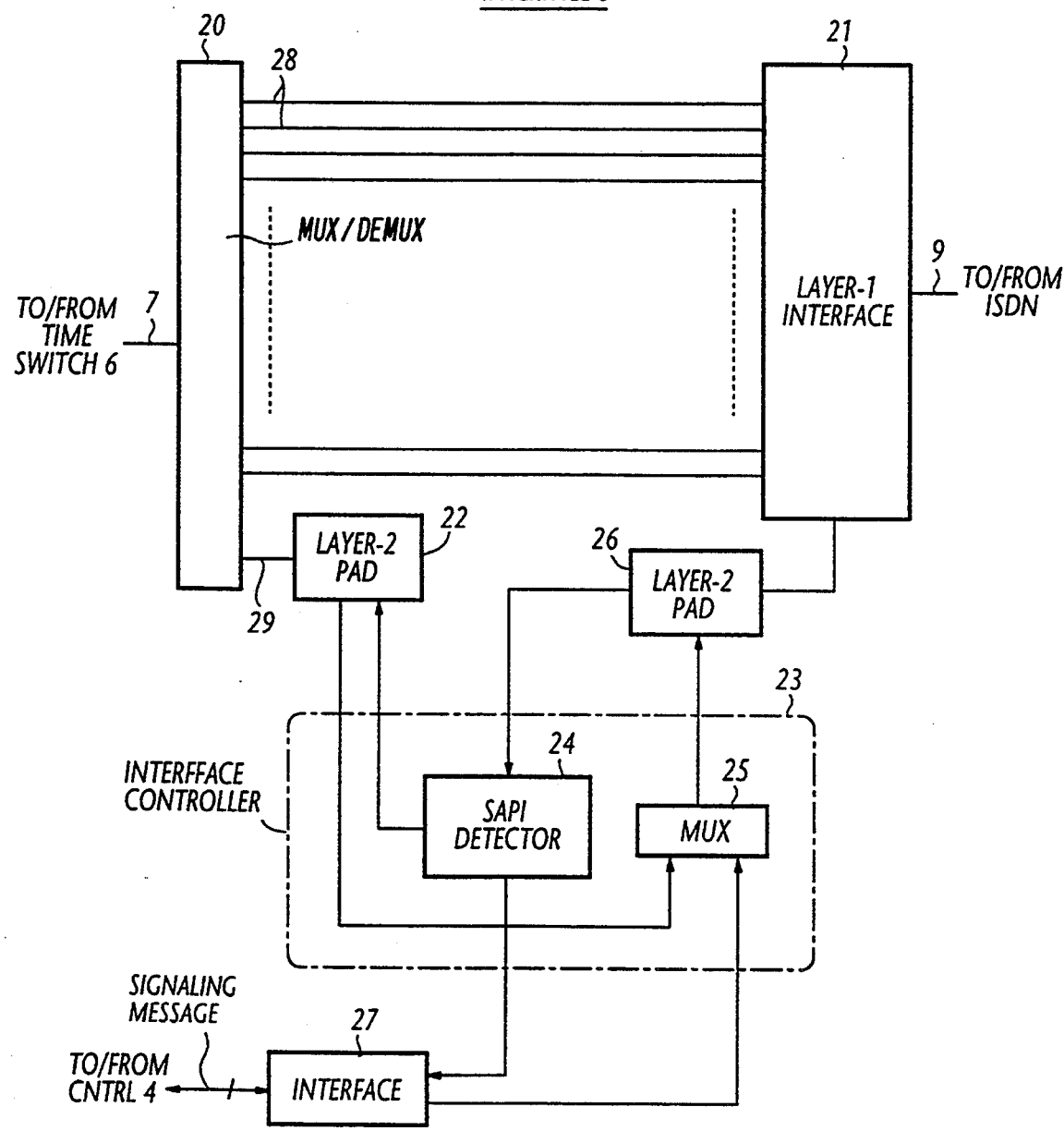

ISDN PRIVATE LOCAL SWITCHING SYSTEM

BACKGROUND OF THE INVENTION

1. Field of the Invention

The present invention relates generally to private local networks, and more specifically to a private local switching system for an Integrated Services Digital Network (ISDN).

2. Description of the Related Art

In the ISDN networks, user packets are transmitted either at the basic rate of 64 kbps on a B-channel (bearer service) or at 16 kpbs on a control channel or D-channel. The packets transmitted on B- and D-channels are referred to as B-channel and D-channel packets, respectively. D-channel packets can be transmitted as a packet-mode signal or as a signaling message. In the current ISDN private branch exchange, the D-channel packets, either packet mode or signaling, are passed to a controller that provides overall control of the PBX including the switch. The signaling message is processed by the controller and then transmitted, as necessary, to the network. The same process occurs in the opposite direction for incoming D-channel packets from the network. One disadvantage of the current PBX is that, since the controller is designed to process signaling messages, the traffic of D-channel packet mode signals imposes an additional load on the controller. Thus, it is highly likely that the total traffic load of the system easily exceeds the capacity of the controller if the D-channel packet mode traffic increases significantly, and as a result, the switching performance of the PBX is severely affected.

SUMMARY OF THE INVENTION

It is therefore an object of the present invention to provide an ISDN private local switching system capable of handling D-channel packet mode traffic without effecting the switching performance of the system.

According to the present invention, there is provided a private local switching system connected to an Integrated Services Digital Network which supports B-channel and D-channel packet transmission rates. The switching system comprises an ISDN user interface unit connected to user terminals and an ISDN network interface unit connected to the ISDN. In the ISDN user interface unit, a signal from each user terminal is separated into a B-channel packet and a D-channel packet and the latter is further separated into a signaling message and a D-channel packet mode signal. The separated D-channel packet mode signal is multiplexed with other D-channel packet mode signals from other user terminals into a D-channel packet mode multiplex signal and applied through a channel to the ISDN network interface unit, while the signaling message is applied to a controller for processing, The ISDN network interface unit receives the signaling message processed by the controller and multiplexes it with the D-channel packet mode multiplex signal from the user interface unit into an outgoing D-channel signal and transmits it with B-channel packets from user terminals to the ISDN.

Preferably, an incoming D-channel packet from the network is received by the ISDN network interface unit and separated into an incoming signaling message and an incoming D-channel packet mode signal. The incoming signaling message is applied to the controller, while the incoming D-channel packet mode signal is applied to the ISDN user interface unit where it is transmitted to an appropriate one of the user terminals. For separating the D-channel packet, the Service Access Point identifier (SAPI) of the packet is examined.

BRIEF DESCRIPTION OF THE DRAWINGS

The present invention will be described in further detail with reference to the accompanying drawings, in which:

FIG. 1 is a schematic block diagram of an ISDN private branch exchange;

FIG. 2 is a block diagram illustrating details of the ISDN user interface of FIG. 1; and FIG. 3 is a block diagram illustrating details of the ISDN network interface of FIG. 1.

DETAILED DESCRIPTION

Referring now to FIG. 1, there is shown a digital private branch exchange (PBX) of the present invention for an integrated services digital network (ISDN). The PBX of this invention comprises an ISDN user interface unit 1 to which user terminals 3 are connected via ISDN basic-rate extension lines 2. Each user terminal 3 is capable of transmitting B-channel packets on either of two basic-rate channels and transmitting D-channel packets on a permanently established virtual logic channel.

User interface unit 1 transmits B-channel user packets on a user-side highway 5 to a time switch 6, separates D-channel user packets into D-channel packet mode data and signaling messages, transmits the latter to a central controller 4, and multiplexes the D-channel packet mode data with B-channel packets onto highway 5 in a manner as will be described.

In response to address information from user interface 1, controller 4 controls time switch 6 by interchanging the time slots of the multiplexed packets so that, if the request is an intra-office call, it is switched back through time switch 6 to user interface unit 1 and, in the case of an outgoing call, it is forwarded through a network-side highway 7 to an ISDN network interface unit 8 which is connected through an ISDN primary-rate exchange line 9 to the ISDN network, not shown. Incoming calls from the ISDN network are received by the network interface unit 8 where signaling messages are directed to controller 4 and B-channel packets and D-channel packet mode data are sent to time switch 6 where their time slots are interchanged according to a control signal from controller 4 and directed to destination user stations.

As shown in FIG. 2, the user interface unit 1 is comprised by ISDN layer-1 (physical layer) interface circuits 10 to which basic-rate user extension lines 2 are respectively terminated. Each layer-1 interface circuit 10 operates as a B- and D-channel separator/combiner, and has two B-channel paths B1 and B2 coupled to a multiplexer/demultiplexer (MUX/DEMUX) 12 and a D-channel path D connected to a layer-2 (signaling link layer) packet assembler/deassembler (PAD) 11. Each PAD 11 deassembles a D-channel packet from the associated user terminal 3 into the ISDN layer-2 level data for internal processing and applies the deassembled data to a D-channel packet separator/combiner, or interface controller 13.

Interface controller 13 comprises a SAPI (Service Access Point Identifier) detecter 14, address translators 15, 17, and a multiplexer/demultiplexer (MUX/-

DEMUX) 16. SAPI detector 14 has input ports connected respectively to the output of layer-2 PADs 11 to examine the 6-bit SAPI subfield of the address field of each deassembled D-channel packet to check to see if the SAPI value is "0" or "16". If SAPI=16, SAPI detector 14 determines that the D-channel packet is a packet mode call, and applies this signal to address translator 15 where the address field of the call is examined. If it is destined to the ISDN network, the logical terminal address of the packet-mode call is translated to a corresponding logical network address and applied to MUX/DEMUX 16, and if it is an intraoffice call (i.e., destined to an extension user of the same PBX), no address translation is performed by translator 15 and simply passed to MUX/DEMUX 16. The output signals from address translator 15 are multiplexed by MUX/DEMUX 16 and fed into a layer-2 PAD 18 where the multiplexed data is assembled into packets, which are then multiplexed with B-channel packets by MUX/DEMUX 12 onto highway 5 and applied to time switch 6.

If SAPI=0, SAPI detector 14 determines that the packet is a signaling message and directs it to an interface 19 from which it is forwarded to central controller 4.

Address translator 17 is connected to MUX/DEMUX 16 to provide translation of the logical network address of D-channel packet mode data from layer-2 PAD 18 to a corresponding logical terminal address. The outputs of address translator 17 are connected respectively to corresponding layer-2 PADs 11 at which outputs of central controller 4 via interface 19 are combined. Address translator 17 provides no translation when the signal from layer-2 PAD 18 is an intraoffice call by simply ignoring it address field.

As illustrated in FIG. 3, the ISDN network interface unit 8 comprises a multiplexer/demultiplexer (MUX/DEMUX) 20 connected, on one side, through the network-side highway 7 to the time switch 6 and connected, on the other side, through B-channel ports 28 to a primary-rate layer-1 interface circuit 21 which is in turn connected to the ISDN network. Through a D-channel port 29 MUX/DEMUX 20 is connected to a layer-2 packet assembler/deassembler 22.

The time slot interchanged outgoing (network-bound) B-channel packets are supplied from MUX/DEMUX 20 through B-channel ports 28 to layer-1 interface circuit 21 where they are multiplexed at the ISDN primary rate onto transmission line 9. The time slot interchanged outgoing D-channel packet mode data is supplied to layer-2 PAD 22 where the format is deassembled for processing in an interface controller 23. The output signal of layer-2 PAD 22 is connected to the interface controller 23 where it is multiplexed by a multiplexer 25 with signaling messages supplied from central controller 4 via an interface 27. The output of multiplexer 25 is coupled to layer-1 interface circuit 21 where it is multiplexed at the ISDN primary rate with the B-channel packets from MUX/DEMUX 20 and transmitted to the network.

A layer-2 PAD 26 is connected to layer-1 network interface circuit 21 to receive the output of multiplexer 25 and converts its format into packet and coupled interface circuit 21 where it is multiplexed with the B-channel packets from MUX/DEMUX 20. Outgoing D-channel packet mode data are transmitted without address translation.

Incoming B-channel packets are demultiplexed and applied to MUX/DEMUX 20. Incoming D-channel packets from the network is demultiplexed from incoming B-channel packets by interface circuit 21 and fed into Layer-2 PAD 26 where their format is deassembled into the layer-2 level for internal processing by controller 23. Similar to the controller 13 of user interface 1, network interface controller 23 includes a SAPI detector 24 which receives the deassembled D-channel packets from layer-2 PAD 26 and examines their SAPI subfields to determine whether they are a D-channel packet mode call or a signaling message. If the packet is determined to be a D-channel packet mode call, it is applied to layer-2 PAD 22 to be assembled into a packet and fed to MUX/DEMUX 20 where it is multiplexed with the incoming B-channel packets and applied through highway 7 to the time switch 6. If the incoming D-channel packet is determined to be a signaling message, it is applied through interface 27 to central controller 4.

The time slots of incoming packet mode D-channel signals are interchanged by time switch 6 and demultiplexed by MUX/DEMUX 12 of user interface unit 1. These signals are separated from the incoming B-channel packets and applied to layer-2 PAD 18 where their format is deassembled for processing by address translator 17. The logical network addresses of the incoming packet mode D-channel signals are translated by translator 17 to corresponding logical terminal addresses. Following the address translation, the deassembled packets are supplied according to their terminal addresses to appropriate layer-2 PADs 11 and thence to associated interface circuits 10.

A packet mode D-channel data of intraoffice call (extension-to-extention) appears, after time slot interchanging, at layer-2 PAD 18 and is deassembled for internal processing and applied to MUX/DEMUX 16 and passed through translator 17 without address translation to the layer-2 PAD 11 of the destination user.

In this way, the central controller 4 is relieved of the traffic of D-channel packet mode calls while enabling it to exclusively dedicate its function to signaling messages.

While mention has been made of a private local switching system where a time switch is employed for switching purposes, the present invention could equally be as well employed for a concentrator/deconcentrator (demultiplexer) system in which outgoing calls to the ISDN network are concentrated to a reduced number of channels and incoming calls from the network are demultiplexed to the channels of all user stations, This can be accomplished by establishing permanent virtual logical channels between the user interface 1 and network interface unit 8.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A private local switching system connected to an Integrated Services Digital Network (ISDN) which supports B-channel and D-channel packet transmission rates, comprising:

an ISDN user interface circuit connected to user terminals, each of said user terminals transmitting a signal comprising a B-channel packet and a D-channel packet, said D-channel packet comprising a signaling message and a D-channel packet mode signal, said ISDN user interface circuit comprising:
a plurality of first separator means corresponding respectively with said user terminals, each of said first separator means separating the B-channel packet and the D-channel packet of a signal transmitted from said corresponding user terminal;
second separator means, connected to receive D-channel packets from said plurality of said first separator means for separating the signaling message and the D-channel packet mode signal of each of said D-channel packets;
first multiplexer means connected to receive the D-channel packet mode signal of each of said user terminals from said second separator means for multiplexing said D-channel packet mode signals from all of said user terminals into a D-channel packet mode multiplex signal;
a controller connected to receive the signaling messages of each of said user terminals from said second separator means for processing said signaling messages and producing a control signal;
switching means connected to receive B-channel packets from said plurality of first separator means for switching said B-channel packets and for switching individual components of said D-channel packet mode multiplex signal according to said control signal; and
an ISDN network interface circuit comprising:
second multiplexer means connected to receive said control signal for multiplexing said signaling messages from each of said first separator means processed by said controller with a corresponding one of said individual components of said D-channel packet mode multiplex signal received from said switching means into an outgoing D-channel signal; and
means connected to receive said B-channel packets from said switching means for receiving a particular B-channel packet and said outgoing D-channel signal from said second multiplexer means corresponding to said particular B-channel packet and transmitting said particular B-channel packet with said received outgoing D-channel signal to said Network.

2. A private local switching system as claimed in claim 1, wherein said ISDN network interface circuit further comprises:
third separator means connected to receive said outgoing D-channel signal as an incoming D-channel signal for separating a D-channel packet into an incoming signaling message and an incoming D-channel packet mode signal and coupling said incoming signaling message to said controller and coupling said incoming D-channel packet mode signal to said switching means,
wherein said ISDN user interface circuit further comprises demultiplexer means for receiving said incoming D-channel packet mode signal through said switching means and applying said incoming D-channel packet mode signal to one of said user terminals.

3. A private local switching system as claimed in claim 1, wherein each of said D-channel packets from said user terminals contains a Service Access Point Identifier (SAPI), and wherein said second separator means examines said SAPI of each of said D-channel packets from said plurality of said first separator means for separating said each of said D-channel packets into said signaling message and said D-channel packet mode signal according to a value of said examined SAPI.

4. A private local switching system as claimed in claim 2, wherein each of said D-channel packets from said user terminals contains a Service Access Point Identifier (SAPI), and wherein said third separator means examines said SAPI of each of the D-channel packets from said Network for separating said each of said D-channel packets into said incoming signaling message and said incoming D-channel packet mode signal according to a value of said examined SAPI.

5. A private local switching system as claimed in claim 1, wherein said ISDN user interface circuit further comprises address translation means for translating an address contained in said D-channel packet mode signal separated by said second separator means into a network address.

6. A private local switching system as claimed in claim 2, wherein said ISDN user interface circuit further comprises address translation means for translating an address contained in said incoming D-channel packet mode signal separated by said third separator means into a terminal address.

7. A private local switching system as claimed in claim 1, wherein said switching means comprises a time-slot interchanging means.

* * * * *